United States Patent
Swenson

(10) Patent No.: US 10,220,760 B2
(45) Date of Patent: Mar. 5, 2019

(54) DECEASED ANIMAL MOVING DEVICE

(71) Applicant: Tim Swenson, Marshall, MN (US)

(72) Inventor: Tim Swenson, Marshall, MN (US)

(*) Notice: Subject to any disclaimer, the term of this patent is extended or adjusted under 35 U.S.C. 154(b) by 237 days.

(21) Appl. No.: 15/052,832

(22) Filed: Feb. 24, 2016

(65) Prior Publication Data

US 2017/0240087 A1 Aug. 24, 2017

(51) Int. Cl.
*B60P 1/54* (2006.01)
*B62D 55/06* (2006.01)
*B62D 51/02* (2006.01)

(52) U.S. Cl.
CPC .............. *B60P 1/54* (2013.01); *B62D 51/02* (2013.01); *B62D 55/06* (2013.01)

(58) Field of Classification Search
CPC ......... B60P 1/54; B60P 1/5404; B60P 1/5438; B60P 1/5423; B60P 3/04; B60P 3/28; B62D 55/06; B62D 55/18; B66C 23/36; B66F 9/06; B60R 9/06
See application file for complete search history.

(56) References Cited

U.S. PATENT DOCUMENTS

| | | | |
|---|---|---|---|
| 2,417,612 A * | 3/1947 | Provenzano | B64F 1/22 244/1 R |
| 2,643,012 A * | 6/1953 | Wahl | A01G 23/006 144/4.1 |
| 3,066,810 A * | 12/1962 | Sartin | B60P 3/41 212/261 |
| 4,435,115 A | 3/1984 | Orstad | |
| 4,806,063 A | 2/1989 | York | |
| 5,168,947 A | 12/1992 | Rodenborn | |
| 5,249,910 A * | 10/1993 | Ball | B60P 3/1058 114/344 |
| 5,509,639 A * | 4/1996 | Ellis | B60P 3/12 224/517 |
| 5,662,451 A | 9/1997 | Muzzi | |
| 5,800,117 A * | 9/1998 | Milton | B66C 23/48 254/4 R |
| 6,530,738 B2 | 3/2003 | Maxwell | |
| 6,626,748 B2 | 9/2003 | Horner | |
| 6,769,858 B1 * | 8/2004 | Butler | B60P 1/4421 414/462 |
| 6,796,396 B2 | 9/2004 | Kamen | |
| 7,156,246 B2 | 1/2007 | Sherrod | |
| 7,210,590 B2 | 5/2007 | Labrecque | |
| 8,366,373 B2 * | 2/2013 | Wood | B60P 3/12 212/175 |
| 2008/0264990 A1 * | 10/2008 | Riegert | B60R 9/06 224/519 |
| 2013/0280020 A1 * | 10/2013 | O'Brien | B66C 23/36 414/543 |
| 2016/0311666 A1 * | 10/2016 | Anderson | B66D 1/36 |
| 2017/0096090 A1 * | 4/2017 | Thompson | B60P 1/54 |

* cited by examiner

*Primary Examiner* — Glenn F Myers

(57) ABSTRACT

A deceased animal moving device lifts and transports a deceased animal. The device includes a base configured for being moved on a surface. A mast is coupled to and extends upwardly from the base. A winch is coupled to a top of the mast providing a spool and a line selectively extendable from and retractable onto the spool. A shield coupled to the base has a lower edge positioned at a front of the base proximate a bottom of the base. The line is directed from the spool towards the shield for lifting a deceased animal attached to the line upwardly against the shield when the line is retracted.

1 Claim, 6 Drawing Sheets

US 10,220,760 B2

DECEASED ANIMAL MOVING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art including information disclosed under 37 CFR 1.97 and 1.98.

The disclosure and prior art relates to moving devices and more particularly pertains to a new moving device for lifting and transporting a deceased animal.

BRIEF SUMMARY OF THE INVENTION

An embodiment of the disclosure meets the needs presented above by generally comprising a base configured for being moved on a surface. A mast is coupled to and extends upwardly from the base. A winch is coupled to a top of the mast providing a spool and a line selectively extendable from and retractable onto the spool. A shield coupled to the base has a lower edge positioned at a front of the base proximate a bottom of the base. The line is directed from the spool towards the shield for lifting a deceased animal attached to the line upwardly against the shield when the line is retracted.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
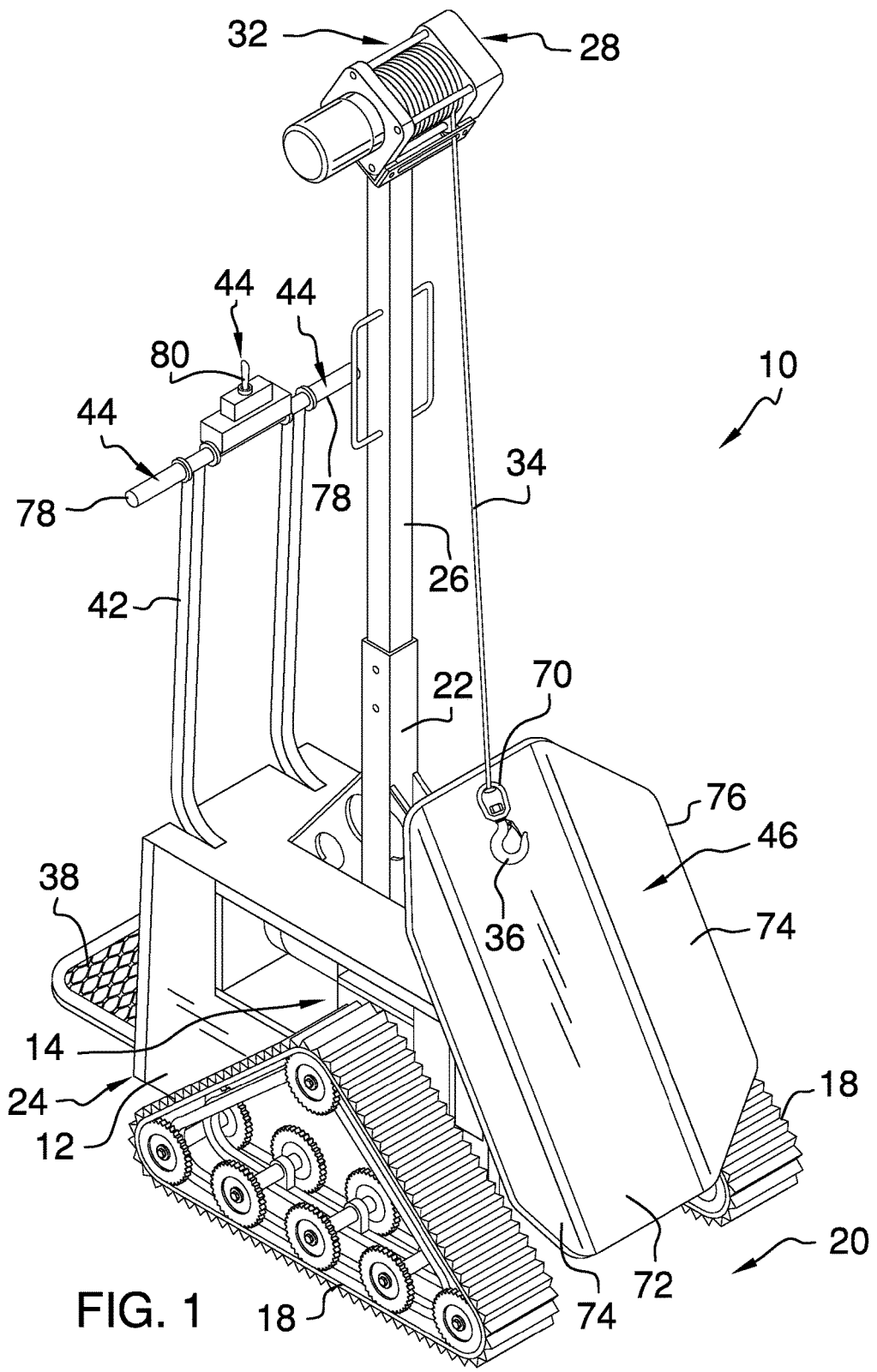
FIG. 1 is a top front side perspective view of a deceased animal moving device according to an embodiment of the disclosure.
Figure 2:
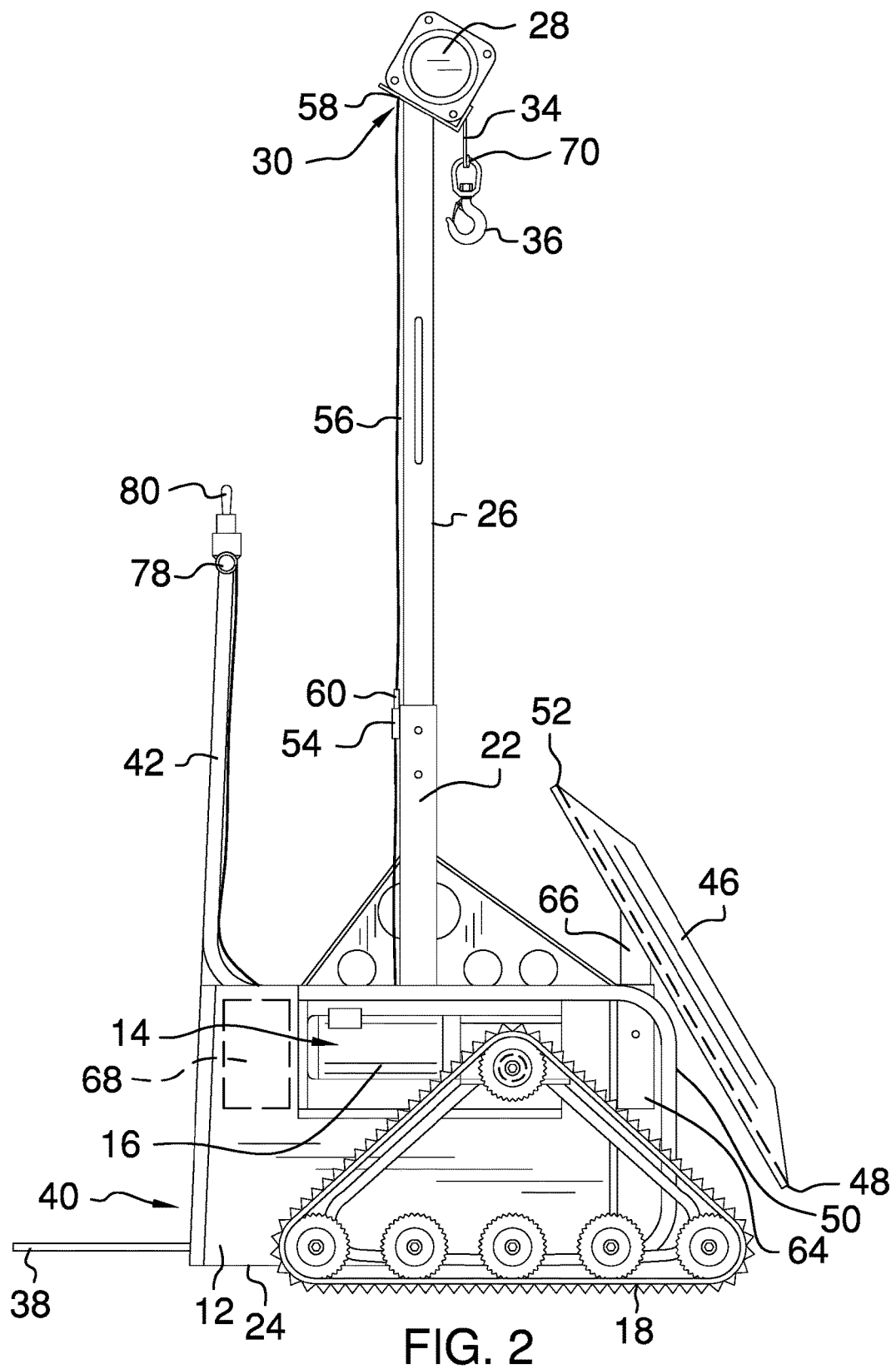
FIG. 2 is a side view of an embodiment of the disclosure.
Figure 3:
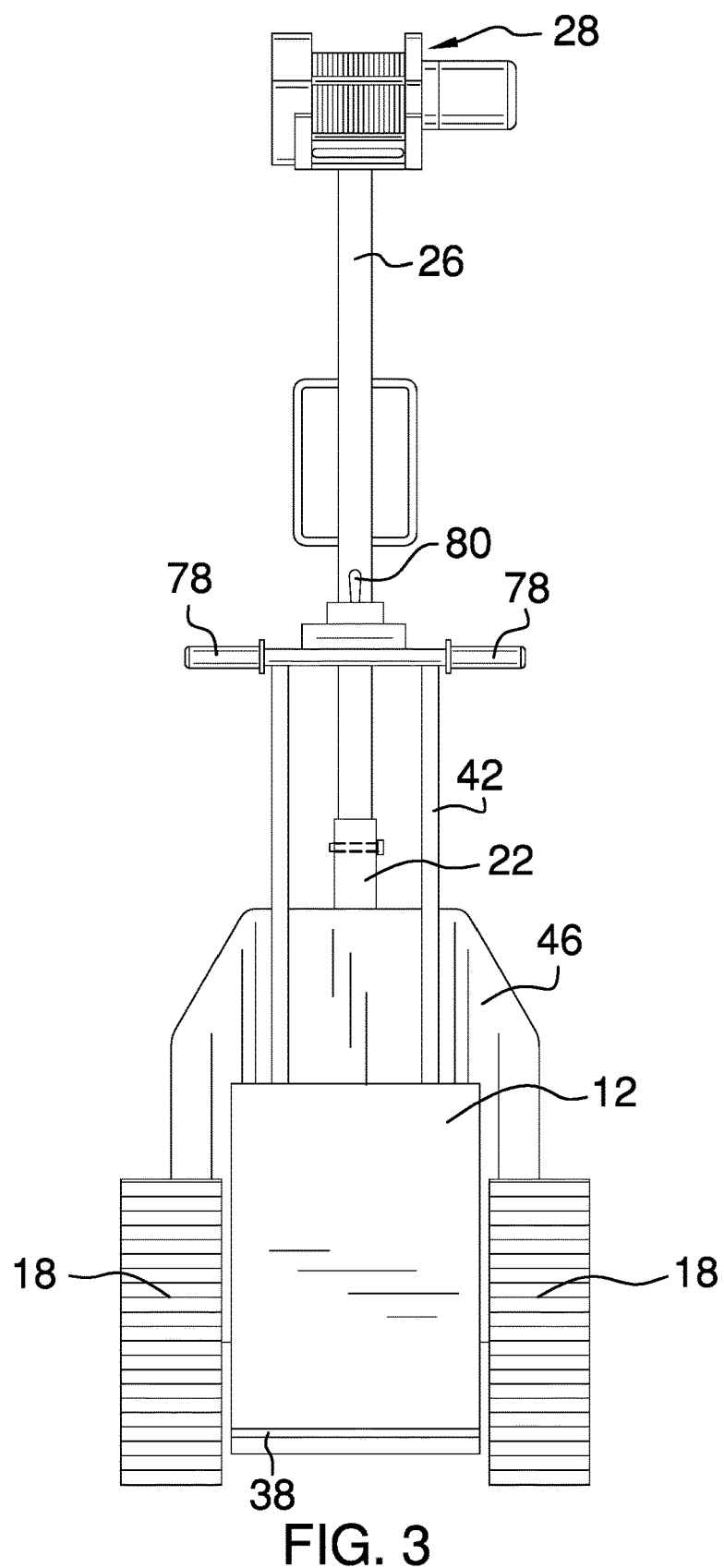
FIG. 3 is a rear view of an embodiment of the disclosure.
Figure 4:
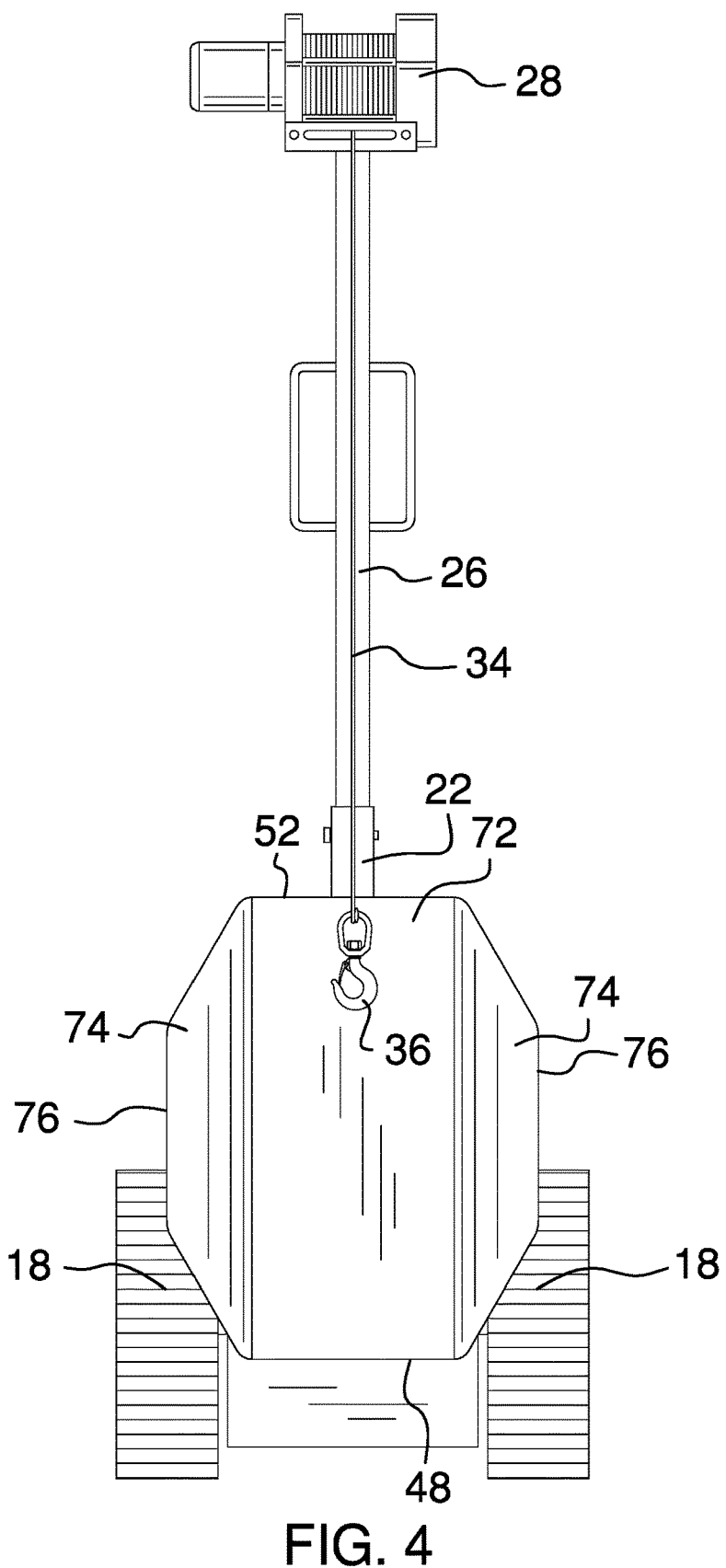
FIG. 4 is a front view of an embodiment of the disclosure.
Figure 5:
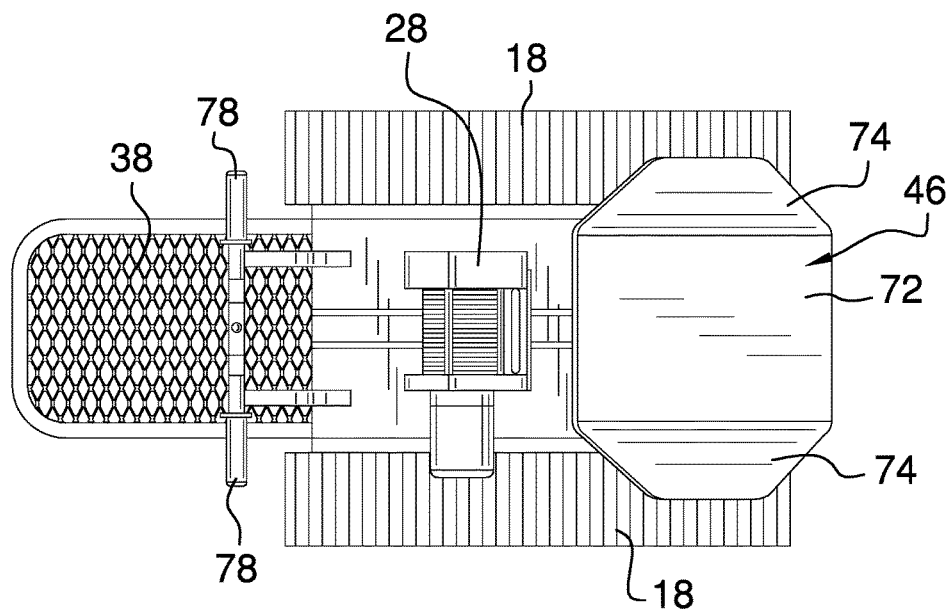
FIG. 5 is a top view of an embodiment of the disclosure.
Figure 6:
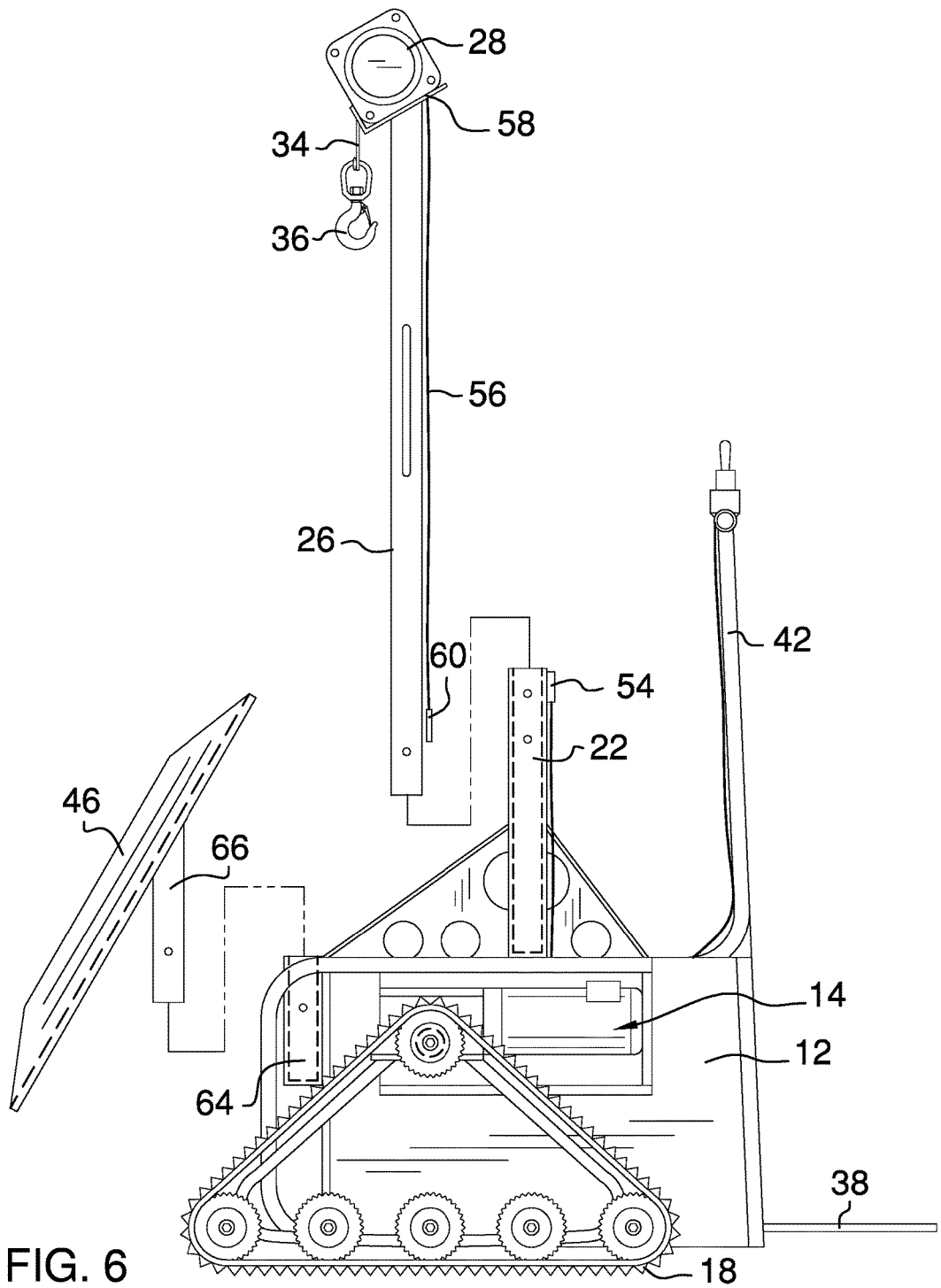
FIG. 6 is a partially exploded view of an embodiment of the disclosure.

With reference now to the drawings, and in particular to FIGS. 1 through 6 thereof, a new moving device embodying the principles and concepts of an embodiment of the disclosure and generally designated by the reference numeral 10 will be described.

As best illustrated in FIGS. 1 through 6, the deceased animal moving device 10 generally comprises a base 12. The base 12 generally comprises a frame or housing. A power source 14 is coupled to the base 12. The power source 14 is a motor 16 powered by a battery 68 also coupled to or carried on the base 12. Alternatively, a gas powered engine may be used as the power source 14. A pair of tracks 18 is coupled to the base 12 wherein the base 12 is configured for being moved on a surface 20.

A mast receiver 22 is coupled to the base 12. The mast receiver 22 is elongated and may be a length of tubular metal. A longitudinal axis of the mast receiver 22 is oriented perpendicular to a bottom 24 of the base 12. A mast 26 is coupled to and extends upwardly from the base 12. The mast 26 is removably couplable to the mast receiver 22. Conventional biased locking pins, cotter pins, or the like may be used to secure the mast 26 to the mast receiver 22.

A winch 28 is coupled to a top 30 of the mast 26. The winch 28 includes a spool 32 and a line 34 selectively extendable from and retractable onto the spool 32. A hook 36 is coupled to a distal end 70 of the line 34 relative to the spool 32. The hook 36 may be used to engage the line 34 wherein the line 34 is configured for being secured to a deceased animal or other heavy item.

A platform 38 is coupled to and extends from the base 12. The platform 38 extends outwardly from a rear side 40 of the base 12. A handle 42 is coupled to the base 12. The handle 42 extends upwardly from the base 12 proximate the platform 38. Operational controls 44 are coupled to the handle 42 wherein the operational controls 44 are configured to be accessible to a person standing on the platform 38. The operational controls 44 are operationally coupled to the tracks 18 and the winch 28 for controlling operation of the tracks 18 and the winch 28 in a conventional manner. The operational controls 44 may include a pair of twistable grips 78 each operationally coupled to controlling a direction of an associated one of the tracks 18. The operational controls 44 may also include a toggle 80 or similar mechanism for operation of the winch 28. A connection port 54 is coupled to the mast receiver 22. A cord 56 has a first end 58 coupled to the winch 28 and a second end 60 removably couplable to the connection port 54. The connection port 54 provides connection between the winch 28 and the power source 14 and operational controls 44 for operation of the winch 28.

A shield 46 is coupled to the base 12. The shield 46 has a lower edge 48 positioned at a front 50 of the base 12 proximate the bottom 24 of the base 12. The line 34 is directed from the spool 32 towards the shield 46 wherein the line 34 is configured for lifting the deceased animal attached to the line 34 upwardly against the shield 46 when the line 34 is retracted. The shield 46 is angled relative to the base 12 such that the shield 46 extends from the lower edge 48 towards the base 12 and an upper edge 52 of the shield 46 is positioned over the base 12. Thus, retraction of the line 34 lifts the deceased animal up to be supported on the shield 46 opposite the platform 38. The shield 46 may have a planar medial section 72 and angled outer sections 74 forming a cradle for inhibiting lateral movement of the deceased animal over lateral edges 76 of the shield 46.

The deceased animal may be lifted sufficiently to allow movement of the base 12 wherein the deceased animal may be transported as desired. A shield receiver 64 is coupled to the base 12. The shield receiver 64 is elongated and a longitudinal axis of the shield receiver 64 is oriented perpendicular to the bottom of the base 12. A post 66 is coupled to and extends from the shield 46. The post 66 is removably couplable to the shield receiver 64. The post 66 may be secured to the shield receiver 64 using a biased locking pin, cotter pin, or other conventional device. Thus, the shield 46 may be easily replaced or removed entirely if desired. The shield receiver 64 may generally be used for connecting implements to the base 12 such as various sizes and shapes of shields or other attachments as might be desired.

In use, the shield 46 and mast 26 are attached to the base 12. The base 12 is driven to a location adjacent to the deceased animal. The line 34 is extended from the spool 32 of the winch 28. line 34 is coupled to the deceased animal and retracted. Retraction of the line 34 pulls the deceased animal towards the base 12 and then upwardly to be supported on the shield 46. When sufficiently lifted, the deceased animal is moved by again driving the base 12 to a desired location where the deceased animal may be disposed of in a desired manner.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A deceased animal moving device comprising:

a base;

a pair of tracks coupled to said base wherein said base is configured for being moved on a surface;

a mast receiver coupled to said base, said mast receiver being elongated, a longitudinal axis of said mast receiver being oriented perpendicular to a bottom of said base;

a mast coupled to and extending upwardly from said base, said mast being removably couplable to said mast receiver;

a winch, said winch being coupled to a top of said mast, said winch including a spool and a line selectively extendable from and retractable onto said spool;

a shield coupled to said base, said shield having a lower edge positioned at a front of said base proximate said bottom of said base, said line being directed from said spool towards said shield wherein said line is configured for lifting a deceased animal attached to said line upwardly against said shield when said line is retracted, said shield being angled relative to said base such that said shield extends from said lower edge towards said base and an upper edge of said shield is positioned over said base;

a connection port coupled to said mast receiver;

a cord having a first end coupled to said winch, said cord having a second end removably couplable to said connection port;

a power source coupled to said base, said connection port being operationally coupled to said power source;

a shield receiver coupled to said base, said shield receiver being elongated, a longitudinal axis of said shield receiver being oriented perpendicular to said bottom of said base;

a post coupled to and extending from said shield, said post being removably couplable to said shield receiver;

a platform coupled to and extending from said base, said platform extending outwardly from said base opposite said shield;

a handle coupled to said base, said handle extending upwardly from said base proximate said platform; and operational controls being coupled to said handle wherein said operational controls are configured to be accessible to a person standing on said platform, said operational controls being operationally coupled to said tracks and said winch for controlling operation of said tracks and said winch.

* * * * *